United States Patent Office 3,686,256
Patented Aug. 22, 1972

3,686,256
SUBSTITUTED 2-HALO-3-THIOCYANATO-ACRYLATES
Karl Ludwig Hock, Ludwigshafen, and Ernst-Heinrich Pommer, Limburgerhof, Germany, assignors to Badische Anilin- & Soda-Fabrik Aktiengesellschaft Ludwigshafen (Rhine), Germany
No Drawing. Filed Aug. 8, 1969, Ser. No. 848,695
Claims priority, application Germany, Aug. 16, 1968,
P 17 93 204.6
Int. Cl. C07c 161/02
U.S. Cl. 260—454                                    6 Claims

ABSTRACT OF THE DISCLOSURE

New and valuable substituted 2-halo-3-thiocyanatoacrylates and a process for controlling fungi with these compounds.

The invention relates to new and valuable 2-halo-3-thiocyanatoacrylates and fungicides containing them.

It is known to use tetramethylthiuram disulfide for controlling fungi; however, its action is unsatisfactory.

We have now found that compounds having the formula

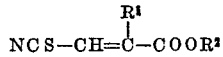

$$NCS-CH=\overset{R^1}{\underset{|}{C}}-COOR^2$$

where $R^1$ denotes a halogen radical (chlorine, bromine or iodine) and $R^2$ denotes a saturated or unsaturated alkyl radical, a cyclohexyl radical, a benzyl radical, a naphthyl radical or a phenyl radical which may be substituted by methyl, chloro or $-NO_2$, have a good action on plant-damaging fungi, e.g. *Rhizoctonia solani* and on ligniperdous fungi, e.g. *Coniophora cerebella*.

The substituted 2-halo-3-thiocyanatoacrylates may be prepared by reaction of 2,3-dihaloacrylates with potassium thiocyanate.

15 parts of potassium thiocyanate is added to a solution of 15.5 parts of methyl 2,3-dichloroacrylate in 100 parts of glycol. While stirring, the mixture is heated at 100° C. for one hour. After cooling, methyl 2-chloro-3-thiocyanato acrylate is precipitated with 100 parts of water, 12.5 parts of the compound having a melting point of 75° C. is obtained by recrystallization from benzene.

Examples of active ingredients according to the invention are as follows:

| | | B.P. (° C.) | M.P. (° C.) |
|---|---|---|---|
| 1 | NCS—CH=CCl—COOCH₃ | | 75 |
| 2 | NCS—CH=CCl—COOC₂H₅ | ¹ 85 | 50 |
| 3 | NCS—CH=CBr—COOC₂H₅ | ² 97 | 58 |
| 4 | NCS—CH=CI—COOC₂H₅ | ³ 105 | 57 |
| 5 | NCS—CH=CCl—COOCH₂—CH(CH₃)CH₃ | ³ 80 | |
| 6 | NCS—CH=CCl—COO—C₆H₅ | | 92 |
| 7 | NCS—CH=CCl—COO—C₆H₄—Cl | | 140 |
| 8 | NCS—CH=CCl—COO—CH₂—C₆H₅ | | 83 |
| 9 | NCS—CH=CCl—COO—C₆H₁₁ | ³ 123 | |
| 10 | NCS—CH=C(Cl)—COOCH₂—CH=CH₂ | ² 102 | 42 |
| 11 | NCS—CH=C(Cl)—COO—(CH₂)₁₁CH₃ | | 56 |
| 12 | NCS—CH=C(Cl)—COO—C₆H₄—CH₃ | ¹ 147 | 52 |
| 13 | NCS—CH=C(Cl)—COO—C₆H₄—NO₂ | | 202 |
| 14 | NCS—CH=C(Cl)—COO—C₁₀H₇ | | 129 |

¹ 0.2 mm.
² 0.3 mm.
³ 0.1 mm.

The fungicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution wtih water may be prepared from active ingredient, emulsifying or dispersing agent and possibly solvent.

Dusts may be prepared by mixing or grinding the active ingredients with a solid carrier.

The following comparative experiments demonstrate the superiority of the fungicides according to this invention over known active ingredients.

EXAMPLE

The following table illustrates the extent of inhibition on the fungus *Aspergillus niger* in nutrient solution. The nutrient solutions were inoculated with fungus spores and incubated for 120 hours at 36° C. The extent of fungus growth was then assessed, employing the following scale: 0=no fungus growth, graduated down to 5= uninhibited fungus growth.

| Active ingredient | Amount of active ingredient in the nutrient solution in parts by weight of active ingredient per million parts of nutrient solution | | | | |
|---|---|---|---|---|---|
| | 50 | 25 | 10 | 5 | 1 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 3 |
| 7 | 0 | 0 | 0 | 0 | 1 |
| 8 | 0 | 0 | 0 | 0 | 0 |
| 9 | 0 | 0 | 0 | 3 | 5 |
| Tetramethylthiuram disulfide [1] | 1 | 2 | 3 | 5 | 5 |
| Control (untreated) | | | 5 | | |

[1] Prior art compound for comparison purposes.

EXAMPLE 2

The active ingredients were dissolved in acetone in amounts of 0.01 and 0.005% (by weight, with reference to the amount of agar) and uniformly distributed in a malt nutrient agar still in the liquid state. The agar was poured into Petri dishes having a diameter of 5 cm. After solidification of the agar, the dishes were centrally inoculated with mycelium flakes of *Coniophora cerebella*. The dishes were incubated at 25° C. and the extent of the development of the fungus colony determined after six days.

0=no fungus growth.
1=diameter of the fungus colony of 0.5 to 1 cm.
2=diameter of the fungus colony of 1 to 2 cm.
3=diameter of the fungus colony of 2 to 2.5 cm.
4=diameter of the fungus colony of 2.5 to 4.5 cm.
5=diameter of the fungus colony of 4.5 to 5 cm.

| | *Coniophora cerebella* | |
|---|---|---|
| | Percentage active ingredient in the agar | |
| Active ingredient | 0.01 | 0.005 |
| 1 | 0 | 0 |
| 2 | 0 | 0 |
| 3 | 0 | 0 |
| 4 | 0 | 0 |
| 5 | 0 | 0 |
| 8 | 0 | 1 |
| 9 | 0 | 0 |
| Tetramethylthiuram disulfide [1] | 3 | 4 |
| Control (untreated) | 5 | |

[1] Prior art compound for comparison purposes.

EXAMPLE 3

The active ingredients were dissolved in acetone in amounts of 0.02 and 0.01% (by weight, with reference to the amount of agar) and uniformly distributed in a malt nutrient agar still in the liquid state. The agar was then poured into Petri dishes having a diameter of 5 cm. After solidification of the agar, the dishes were centrally inoculated with mycelium flakes of *Rhizoctonia solani*. The dishes were incubated at 25° C. and the extent of the development of the fungus colony determined after four days.

1=diameter of the fungus colony of 0.5 to 1 cm.
2=diameter of the fungus colony of 1 to 2 cm.
3=diameter of the fungus colony of 2 to 2.5 cm.
4=diameter of the fungus colony of 2.5 to 4.5 cm.
5=diameter of the fungus colony of 4.5 to 5 cm.

| | *Rhizoctonia solani* | |
|---|---|---|
| | Percentage active ingredient in the agar | |
| Active ingredient | 0.02 | 0.01 |
| 1 | 0 | 1 |
| 2 | 0 | 1 |
| 3 | 0 | 0 |
| 4 | 0 | 0 |
| 5 | 0 | 0 |
| 8 | 0 | 1 |
| 9 | 0 | 1 |
| Tetramethylthiuram disulfide [1] | 2 | 3 |
| Control (untreated) | 5 | |

[1] Prior art compound for comparison purposes.

We claim:

1. A substituted 2-halo-3-thiocyanatoacrylate having the formula

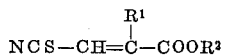

$$NCS-CH=\overset{R^1}{\underset{|}{C}}-COOR^2$$

where $R^1$ denotes chloro, bromo, or iodo and $R^2$ denotes a 1–12 carbon alkyl radical, allyl, a cyclohexyl radical, a benzyl radical, a naphthyl radical or a phenyl radical which may be substituted by methyl, chloro or nitro.

2. A thiocyanatoacrylate as claimed in claim 1 wherein $R^1$ is chloro, $R^2$ is lower alkyl having at most four carbon atoms.

3. A thiocyanatoacrylate as claimed in claim 1 wherein $R^1$ is chloro and $R^2$ is naphthyl, phenyl, chlorophenyl or nitrophenyl.

4. A thiocyanatoacrylate as claimed in claim 1 wherein $R^1$ is chloro and $R^2$ is cyclohexyl.

5. A thiocyanatoacrylate as claimed in claim 1 wherein $R^1$ is chloro and $R^2$ is allyl.

6. A thiocyanatoacrylate as claimed in claim 1 wherein $R^1$ is chloro and $R^2$ is benzyl.

References Cited

UNITED STATES PATENTS

| | | | |
|---|---|---|---|
| 3,097,998 | 7/1963 | Miller | 424—314 |
| 3,161,673 | 12/1964 | Vaughn | 260—486 |
| 3,318,936 | 5/1967 | Sakai et al. | 260—454 |
| 2,409,329 | 10/1946 | Williams | 260—454 |
| 2,722,478 | 11/1955 | Olin | 260—454 |
| 2,909,458 | 10/1959 | Richter | 260—454 |

OTHER REFERENCES

Dvorko et al., "Cyclotrimerization of a Propiolic Ester etc." (1969), CA 70, No. 96122K (1969).

Badische Anilin, "2,3-Dichloroacrylic Esters" (1952), CA 48, p. 10060 (1954).

LEWIS GOTTS, Primary Examiner

G. HOLLRAH, Assistant Examiner

U.S. Cl. X.R.

424—302